United States Patent [19]

Jones

[11] Patent Number: 5,014,738

[45] Date of Patent: May 14, 1991

[54] VALVE

[75] Inventor: David Jones, Winsford, England

[73] Assignee: C.J.S. Sciences Limited, Cheshire, England

[21] Appl. No.: 377,596

[22] Filed: Jul. 10, 1989

[30] Foreign Application Priority Data

Jul. 12, 1988 [GB] United Kingdom ................ 8816499

[51] Int. Cl.$^5$ ............................................. F16K 49/00
[52] U.S. Cl. .................................. 137/340; 251/63.6; 73/23.35
[58] Field of Search ....................... 251/61.1, 28, 63.4, 251/63.6; 137/340, 565, 885; 73/23.1

[56] References Cited

U.S. PATENT DOCUMENTS

| | | | |
|---|---|---|---|
| 2,177,825 | 10/1939 | Grove | 137/340 |
| 2,918,079 | 12/1959 | Krow | 137/340 |
| 3,101,094 | 8/1963 | McKenzie | 137/340 |
| 3,451,423 | 6/1969 | Priese | 137/556 |
| 4,096,908 | 6/1978 | Lamy | 73/23.1 |
| 4,249,564 | 2/1981 | Gelse et al. | 137/340 |
| 4,353,243 | 10/1982 | Martin | 251/61.1 |
| 4,466,251 | 8/1984 | Chellis et al. | 137/340 |
| 4,579,144 | 4/1986 | Lin et al. | 137/565 |
| 4,706,700 | 11/1987 | Jumeau | 137/602 |
| 4,840,347 | 6/1989 | Ariizumi et al. | 251/63.6 |

FOREIGN PATENT DOCUMENTS

| | | |
|---|---|---|
| 2714410 | 10/1977 | Denmark . |
| 2470908 | 11/1980 | France . |
| 401615 | 2/1966 | Switzerland . |
| 573563 | 3/1976 | Switzerland . |

Primary Examiner—A. Michael Chambers

[57] ABSTRACT

A valve, which is particularly useful in the inlet system of a mass spectrometer, has a fluid inlet (60) and a fluid outlet (68). A valve seat (64) is disposed between the fluid inlet (60) and the fluid outlet (68), and a valve closure member in the form of a piston (62) sliding in a cylinder (60), and a diaphragm (56), is engageable with the valve seat.

A chamber (77) for receiving coolant (e.g. liquid nitrogen) is located on the side of the diaphragm (56) opposite the valve seat (64), and by thus cooling the diaphragm, fluid material in contact with the valve closure member is also cooled, and preferably condensed or frozen.

The invention removes the requirement for a U- or T-shaped cold trap as used in conventional systems.

15 Claims, 2 Drawing Sheets

VALVE

DESCRIPTION

1. BACKGROUND OF THE INVENTION

The present invention relates to a valve and a gas sampling system for spectrometers.

2. DESCRIPTION OF THE PRIOR ART

Mass spectrometers are used, for example, in determining the isotopic composition of a gas or vapour. In certain circumstances, e.g. when utilising small samples, it is advantageous to incorporate a cold trap into the inlet system for the mass spectrometer. In use the sample is condensed in the trap, the trap is isolated from the reservoir from which the sample is obtained, connected to the spectrometer inlet and then allowed to warm up. The condensed sample will then vapourise and a much higher proportion of the sample is able to be used. In conventional cold traps the sample from the reservoir is led through a U- or T-shaped tube about which is disposed a reservoir into which coolant, e.g. liquid nitrogen, can be introduced. The U- or T-shaped tube is disposed between the valve which isolates the sample reservoir and the valve which isolates the mass spectrometer. In dealing with very small samples this causes a problem in that the cold trap or cold finger device itself adds quite considerably to the volume of the space between the isolation values which the sample needs to fill.

OBJECT OF THE INVENTION

It is an object of the invention to remove the necessity of a separate cold trap, and thereby enable a greater proportion of the sample to be used.

SUMMARY OF THE INVENTION

According to the present invention there is provided a valve comprising:

a valve housing;

a fluid inlet and a fluid outlet for the passage of fluid through said valve;

valve closure member incorporating a diaphragm and disposed within said valve housing, the diaphragm being sealed about its periphery;

actuating means adapted to displace said valve closure member in a first direction;

a valve seat, disposed between said fluid inlet and said fluid outlet on a first side of said diaphragm, with which said valve closure member is engageable by displacement of said valve closure member in said first direction;

a cooling chamber within said valve housing located on the opposite side of said diaphragm from said valve seat and partly defined by;

an inlet in said valve housing for the ingress of cooling fluid into said cooling chamber and into contact with said diaphragm so as to cool fluid material in contact with said valve closure member on said first side of said diaphragm; and an outlet in said valve housing for the egress of said cooling fluid from said cooling chamber.

such a valve is useful, for example, in an inlet system for a mass spectrometer, the valve essentially being a diaphragm valve and including means for cooling the diaphragm so as to condense (and preferably freeze), on said diaphragm, gaseous material in contact with the diaphragm. The valve of the present invention may be a specifically designed valve or may be a modified version of an existing valve whereby means for cooling the diaphragm are added to the valve.

Also according to the invention there is provided an inlet and/or outlet system incorporating a valve in accordance with the invention.

According to the present invention there is also provided an inlet system for a mass spectrometer, comprising a valve between said mass spectrometer and an inlet, said valve comprising:

a valve housing;

a fluid inlet and a fluid outlet for the passage of fluid through said valve;

a valve closure member incorporating a diaphragm and disposed within said valve housing, the diaphragm being sealed about its periphery;

actuating means adapted to displace said valve closure member in a first direction;

a valve seat, disposed between said fluid inlet and said fluid outlet on a first side of said diaphragm, with which said valve closure member is engageable by displacement of said valve closure member in said first direction;

a cooling chamber within said valve housing located on the opposite side of said diaphragm from said valve seat and partly defined by said diaphragm;

an inlet in said valve housing for the ingress of cooling fluid into said cooling chamber and into contact with said diaphragm so as to cool fluid material in contact with said valve closure member on said first side of said diaphragm; and an outlet in said valve housing for the egress of said cooling fluid from said cooling chamber.

The diaphragm is normally flexed by a piston operated pneumatically or hydraulically, and preferably a piston having a soft portion for seating against a knife edge valve seat is located between the diaphragm and the valve seat.

Preferably the piston includes a central extension which contacts the diaphragm to flex it and this central extension is preferably surrounded by an annular chamber into which coolant such as liquid $N_2$ can be introduced.

There is no need to include a U- or T-shaped cold trap in the system of the present invention since the diaphragm of the valve provides the cold trap. The volume between the two isolation valves is thus considerably reduced relative to a system including a U- or T-shaped cold trap, thereby enabling a greater percentage of the sample to be utilised. This in turn allows for smaller samples to be handled.

In operation the mass spectrometer valve is closed, coolant, e.g. liquid nitrogen, is introduced to the valve, the reservoir isolation valve is opened and the sample passes to the mass spectrometer valve where it freezes on the diaphragm. The reservoir valve is then closed, the coolant removed and the sample allowed to vapourise. The mass spectrometer valve is then opened enabling the vapourised sample to pass into the mass spectrometer, e.g. for analysis.

The valve of this invention may of course be used in a system utilising one or more additional valves which may be in accordance with this invention or not as desired.

BRIEF DESCRIPTION OF THE DRAWINGS

By way of example only, a specific embodiment of the present invention will now be described, with reference to the accompanying drawings, in which.

DESCRIPTION OF THE PREFERRED EMBODIMENT

Figure 1:
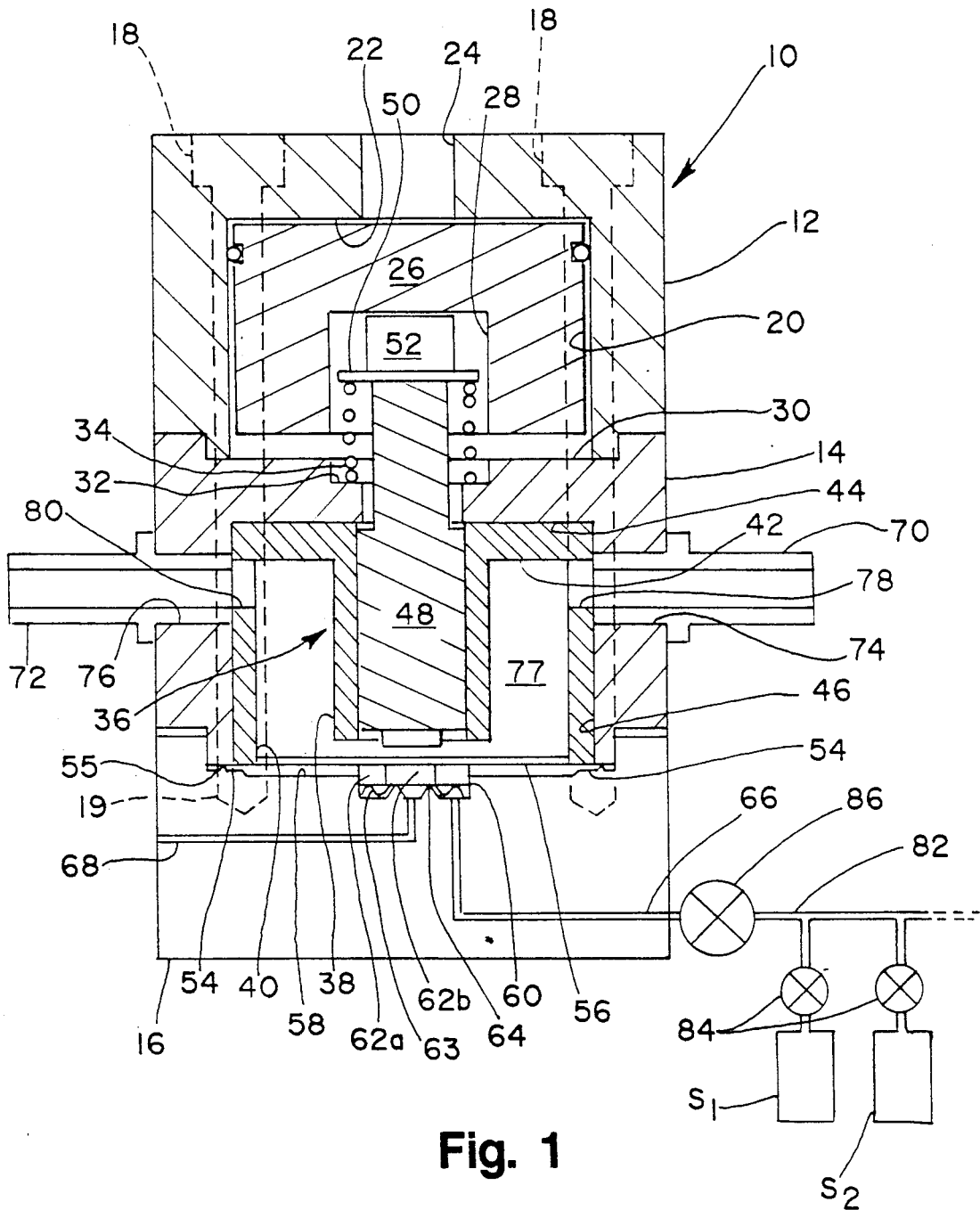
FIG. 1 is a cross-sectional side elevation through an embodiment of valve in accordance with the present invention.

FIG. 1 shows an embodiment of valve in accordance with the present invention which is of the diaphragm type. The valve comprises a metal valve housing 10 which is a generally square block when viewed from the exterior, and which comprises upper, central and lower valve housing portions 12, 14, 16. The three portions are secured together in use by means of a plurality of bolts 18 whose shanks pass through aligned bores in the upper and middle valve housing portions 12, 14 and which are secured into tapped recesses 19 in the lower valve housing portion 16.

The upper valve housing portion 10 is provided with an internal cylindrical bore 20 which is closed off at its upper end by means of an end wall 22 which is provided with a fluid inlet bore in its centre. The cylindrical bore is adapted to slidably receive a first piston 26 of generally cylindrical configuration but also being provided with a central cylindrical recess 28 in its undersurface, coaxial with the piston 26.

The central valve housing portion 14 is provided with a first flat annular portion 30 extending perpendicularly to the longitudinal axis of the valve and which defines the lower limit of displacement of the piston 26. Radially inwardly of the first planar annular portion 30 is an annular shoulder portion 32 upon which, in use, a compression spring 34 (to be explained hereinafter) is seated.

The central valve housing portion 14 is also adapted to receive a guiding member 36 of plastics material such as PTFE. The guiding member comprises radially inner and outer coaxial tubular portions 38, 40 which are connected to a common annular base portion 42. The base portion 42 is adapted to be seated upon a further flat, planar annular portion 44 of the central valve housing portion 14, extending perpendicularly to the longitudinal axis of the valve, and the outer tubular portion 40 is adapted to engage sealingly with an axially-aligned bore 46 in the central valve housing portion 14. The bore defined by the inner tubular portion 36 is adapted to receive a second, actuating piston 48 slidably therein, the piston 48 being provided with a washer 50 at one end thereof which is held on the piston 48 by means of a nut 52. The torsion spring 34 extends between the undersurface of the washer 50 and the shoulder 32, thus biassing the piston 48 upwardly towards contact with the first piston 26 as seen in FIG. 1. The upward displacement of the piston 48 is limited by engagement with the second, flat planar surface 44 of the central valve housing portion 14.

The lower valve housing portion 16 is provided with a first, planar annular, diaphragm seating portion 54 upon which, in use, a metal diaphragm 56 (of 316 stainless steel, 0.25 mm thickness and 50 mm diameter) rests, and is held in position by abutment with the central valve housing portion 14. A raised knife edge 55 on portion 54 forms a vacuum seal to atmosphere between portion 54 and diaphragm 56. The lower valve housing portion is also provided with a wider, radially inner flat annular portion 58 which is normally spaced apart from the diaphragm 56, together with a shallow central bore 60 which is adapted to slidably receive a complementarily-shaped cylindrical guiding piston 62 which abuts the undersurface of the diaphragm 56. The piston comprises an annular stainless steel portion 62a and a central cylindrical portion 62b of softer material such as a plastics material (e.g. "Kel F") or cooper. The piston 62 is also biassed upwardly (as seen in FIG. 1) by means of an annular spring washer 63. The base wall of the bore 60 is provided with an upstanding annular rim 64 which is triangular in cross section, thus forming a knife-edge adapted to sealing abut with the central, softer portion of the guiding piston 62. An inlet passage 66 leads from the exterior of the lower valve housing portion 16 to the annular space defined between the bore 60 and the outer surface of the rim 64, and an outlet passage 68 leads from the space defined between the rim 64 and the guiding piston 62.

It will also be noted that inlet and outlet cooling fluid nozzles 70, 72 are secured in respective bores 74, 76 in diametrically opposite positions in the central valve housing portion 14. The nozzles are adapted to supply cooling fluid to, and remove it from, the space 77 defined between the inner and outer tubular portions, 38, 40 and the diaphragm 56, and for this purpose correspondingly-aligned bores 78, 80 are provided in the outer tubular portion 40.

In use, the inlet 66 may be connected selectively to one of a plurality of sources $S_1$, $S_2$ etc., of samples to be tested. Each source $S_1$, $S_2$ etc. is connectible to a main passageway 82 via a respective valve 84, and admission to the valve is controlled by an isolation valve 86.

The diaphragm valve is operated in a generally conventional way, since the diaphragm may be flexed between a position in which the valve is open, in which the piston 62 is displaced from the annular knife-edge lug 64, and a position in which the valve is closed by means of the downward displacment of the cylinder 48 within the guiding tube 38 which causes the lower end of the piston 48 to contact the upper surface of the flexible diaphragm 56 and urges it into contact with the annular rim 64. This is done by displacement of the first piston 26 within its cylinder bore 20 by application of pneumatic or hydraulic pressure to the pressure inlet aperture 24. This causes downward displacement of the piston 26, which in turn contacts the nut 52 of the piston 48 which in turn is displaced downwardly into contact with the diaphragm 56.

The appropriate sample source S is selected by operation of a respective valve 84, and the isolation valve 86 is then opened to allow gas from one of the sources $S_1$, $S_2$ etc., to enter the annular chamber defined between the bore 60 in the lower valve housing portion 16 and the outer surface of the annular rim 64. The valve is open at this point allowing the sample gas to pass out of the valve. In use, the gas is fed to a mass spectrometer ion source where the gas is ionised and the signal strength monitored. If the signal strength is within a desired window then the sample is set to a target signal using conventional gas feed means via the valve. If the signal strength is too small to achieve the target using the conventional means, then a cooling fluid such as liquid nitrogen is introduced into the chamber defined between the inner and outer tubular portions 38, 40 and the diaphragm 56 via the inlet nozzle 70, and this causes cooling of the diaphragm 56. The sample then freezes on to the underside of diaphragm 56. The isolation valve 86, and valve V are closed and the liquid nitrogen is removed from the chamber above the diaphragm by evaporation. The sample is then allowed to warm up and vapourise within the annular chamber between the bore 60 and the outer surface of the rim 64.

Removal of the actuating pressure from the inlet 24 allows the pistons 26 and 48 to move upwardly by virtue of the compressed spring 34. The spring 63 then urges the piston member 62 upwardly out of engagement with the annular lug 64, thus allowing the vapourised sample to be withdrawn from the valve via the passage 68.

Figure 2:
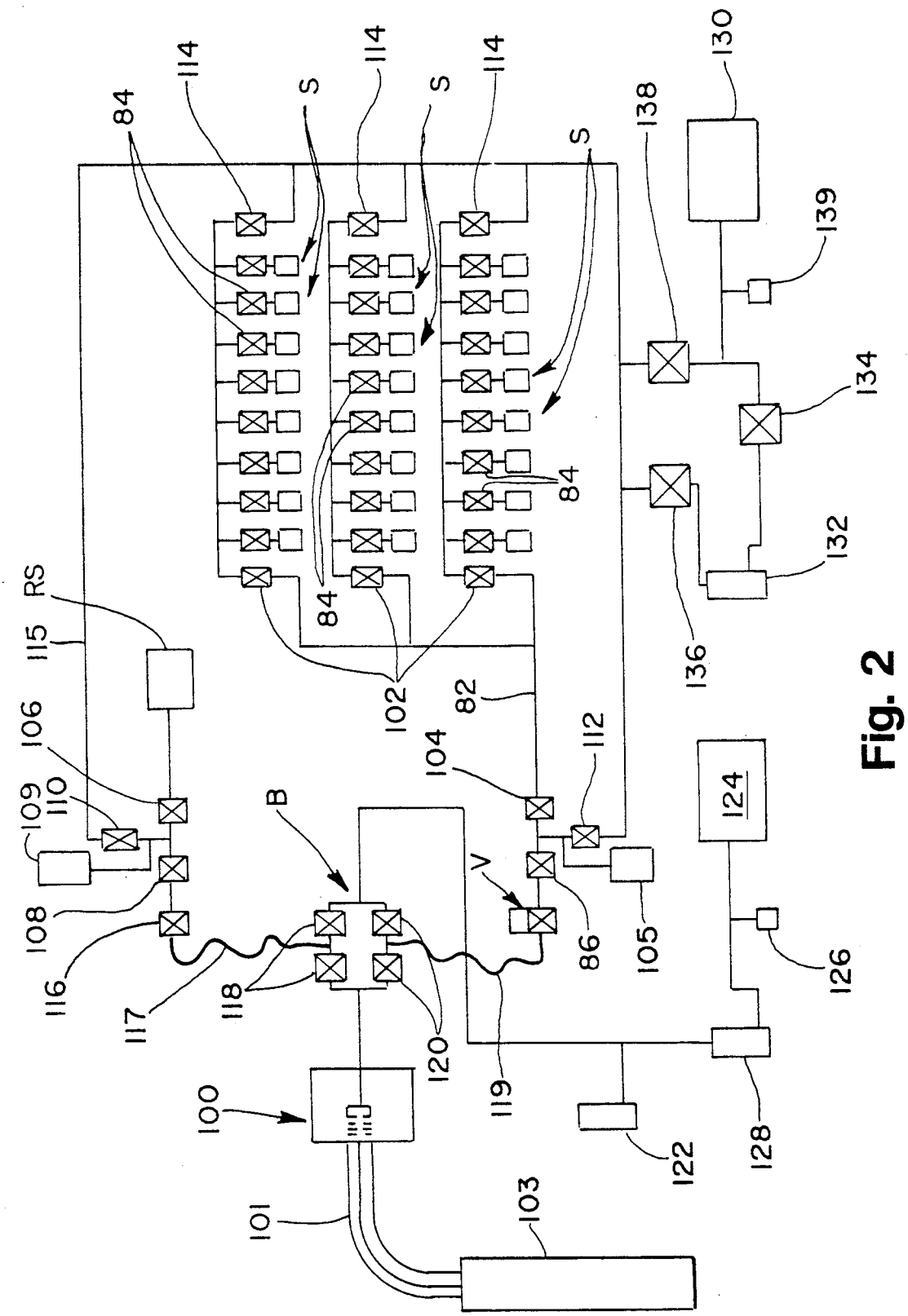
FIG. 2 is a schematic diagram of a gas sampling system utilising the valve of FIG. 1.

Referring now to FIG. 2 of the drawings, a gas sampling system utilising the valve of FIG. 1 is illustrated schematically. Unless otherwise indicated, the valves mentioned hereinafter are conventional valves. The valve of FIG. 1 is indicated at V, and is adapted to condense and supply samples from a selected one of a plurality of souces S to a gas-ion source analyser 100 via a sample capillary 119, and selection valves 120 forming part of a changeover assembly B. Isolation valve 86 is visible in the drawing, as are control valves 102 which act in a similar way to the control valves 84 of FIG. 1, but which each control a bank of eight sources S. Thus, each individual source S is provided with its own valve 84 as well, and appropriate actuation of the valves 102 and the valves 84 is necessary in order to connect a particular source S to gas inlet, valves 104, 112, 86 and the valve V.

An additional isolation valve 104 is located in line 82 to isolate the source S and provide the inlet with as small a volume as possible, so as to increase the compression ratio of a conventional steel variable bellows 105. The sample source banks are connected to a pumping line 115 via pump isolation valves 114 for pumping away analysed samples in preparation for the admittance of a new sample. This line is also connected to the sample inlet via valve 112 and identical reference gas inlet via valve 110. This allows the sample and reference volumes to be evacuated prior to sample and reference gases being admitted to the volumes. Line 115 is connected to a double stage rotary roughing pump 130 (capable of achieving a vacuum of 1E-3 torr) via valve 138. This removes the majority of gas that needs to be removed. Valve 138 is then closed and a diffusion pump backing valve 134 is then opened. An inlet oil diffusion pump 132 (rated at 50 l/s and capable of achiving a vacuum of 1E-7 torr) is then connected to the inlet system via a valve 136 to achieve an ultra high vacuum in the inlet lines. An associated vacuum gauge 139 is also provided.

Reference gas from container RS is admitted to the reference inlet system comprising of valves 106, 108, 110 and 116 with steel variable bellows volume 109. This is fed to the ion source via a capillary 117 and through valves 118.

The valves 118 and 120 form a changeover assembly B to direct gas continuously from the reference RS and the sample, either being fed alternately into the ion source or to the waste diffusion pump 128 (identical to pump 132) and to atmosphere through a rotary backing pump 124.

A diffusion pump 122 (rated at 170 l/s and capable of achieving a vacuum of 1E-9 torr) forms part of a three stage pumping system comprising of pumps 122, 128 and 124 (which is identical to pump 130) to produce an ultra high vacuum in the mass spectrometer analyser. An associated vacuum gauge 126 is also provided. The mass spectrometer comprises an ion source 100, a flight tube 101 and faraday collector system 103.

In use, the mass spectrometer system produces results by comparing the values detected from the sample gas with those detected from known reference gases, usually a set of six pairs of results taken alternatively from sample and reference inlets. Between each sample admission and data analysis, the sample inlet system is evacuated using valves 138, 136, 134 and vacuum pumps 130 and 132 ensuring a clean vacuum for the next sample S from any of the banks of eight valves. Sample S is selected and fed to the inlet system via valves 84, 102 as previously described. The sample gas is then fed to the mass spectrometer ion source where the gas is analysed for ion signal strength. If the signal is above a preset value then the gas is analysed in the normal fashion, that is, the signal strength is increased to a target value by increasing the gas pressure using the variable bellows volume 105. When the target pressure is achieved, the reference gas is then balanced to the signal strength of the sample, thus fixing sample and similar conditions for analysis. If the signal strength is below the preset value then the cooling of the valve diaphragm is effected as described for the FIG. 1 valve. The sample is frozen and vapourised as previously described. The gas is then fed to the analyser through valves 120a while the reference gas is fed through 118b to the waste diffusion pump. The signal strength is then measured and the reference gas signal matched to the sample using variable bellows 109. The conditions are now fixed and analysis of the gases can now take place as previously described.

The invention is not restricted to the details of the foregoing embodiment. For example, the valve of FIG. 1 may be constructed as described, or may be a modification of an existing valve. For example, a diaphragm valve comprising the portions 12, 16 and a piston 26 without the recess 28 may be adapted, by insertion of the central portion 14, the piston 48, spring 34 and by modification of the piston 26, to be substantially identical to that shown in FIG. 1.

I claim:
1. A valve comprising:
a valve housing;
a fluid inlet and a fluid outlet for the passage of fluid through said valve;
a valve closure member incorporating a diaphragm and disposed within said valve housing, the diaphragm being sealed about its periphery;
actuating means adapted to displace said valve closure member in a first direction;
a valve seat, disposed between said fluid inlet and said fluid outlet on a first side of said diaphragm, with which said valve closure member is engageable by displacement of said valve closure member in said first direction;
a cooling chamber within said valve housing located on the opposite side of said diaphragm from said valve seat and partly defined by said diaphragm;
an inlet in said valve housing for the ingress of cooling fluid into said cooling chamber and into contact with said diaphragm so as to cool fluid material in contact with said valve closure member on said first side of said diaphragm; and an outlet in said valve housing for the egress of said cooling fluid from said cooling chamber.

2. A valve as claimed in claim 1, wherein the valve closure member further comprises a valve closure piston located on said first side of said diaphragm, said valve closure piston being engageable with said valve seat by displacement of said valve closure member in said first direction.

3. A valve as claimed in claim 2, wherein said valve closure piston is provided with a relatively soft portion for engagement with said valve seat.

4. A valve as claimed in claim 1, wherein said valve seat is annular.

5. A valve as claimed in claim 1, wherein said valve seat is formed into a knife edge.

6. A valve as claimed in claim 1, comprising a resiliently deformable member acting on said valve closure member to urge said valve closure member out of engagement with said valve seat.

7. A valve as claimed in claim 2, comprising a resiliently deformable member acting on said valve closure piston to urge said valve closure member out of engagement with said valve seat.

8. A valve as claimed in claim 2, wherein the valve closure piston is slidably disposed within a complementarily-shaped cylinder in said valve housing.

9. A valve as claimed in claim 1, wherein said actuating means comprises a first actuating piston which is displaceable into engagement with said valve closure member in said first direction by means of fluid pressure.

10. A valve as claimed in claim 9, wherein said first piston is slidably disposed within a complementarily shaped cylinder portion.

11. A valve as claimed in claim 10, wherein said cooling chamber is annular and surrounds said cylinder portion within which said first actuating piston is slidably disposed.

12. A valve as claimed in claim 9, further comprising further resiliently deformable biassing means adapted to urge said first actuating piston in a direction opposite to said first direction.

13. A valve as claimed in claim 12, wherein said resiliently deformable biassing means comprises a spring.

14. A valve as claimed in claim 9, wherein said actuating means further comprises a second actuating piston adapted to abut said first actuating piston and slidably disposed within a complementarily-shaped cylinder to which, in use, as actuating fluid pressure is applied to displace said first and second actuating pistons in said first direction.

15. An inlet system for a mass spectrometer, comprising a valve between said mass spectrometer and an inlet, said valve comprising:
   a valve housing;
   a fluid inlet and a fluid outlet for the passage of fluid through said valve;
   a valve closure member incorporating a diaphragm and disposed within said valve housing, the diaphragm being sealed about its periphery;
   actuating means adapted to displace said valve closure member in a first direction;
   a valve seat, disposed between said fluid inlet and said fluid outlet on a first side of said diaphragm, with which said valve closure member is engageable by displacement of said valve closure member in said first direction;
   a cooling chamber within said valve housing located on the opposite side of said diaphragm from said valve seat and partly defined by said diaphragm;
   an inlet in said valve housing for the ingress of cooling fluid into said cooling chamber and into contact with said diaphragm so as to cool fluid material in contact with said valve closure member on said first side of said diaphragm; and
   an outlet in said valve housing for the egress of said cooling fluid from said cooling chamber.

* * * * *